United States Patent [19]

Chu et al.

[11] Patent Number: 5,177,163

[45] Date of Patent: Jan. 5, 1993

[54] LIGHT COLORED, AROMATIC-MODIFIED PIPERYLENE RESINS

[75] Inventors: Sung G. Chu, Hockessin, Del.; Norman E. Daughenbaugh, Jr., Turtle Creek; Mark J. Rosner, Jeannette, both of Pa.

[73] Assignee: Hercules Incorporated, Wilmington, Del.

[21] Appl. No.: 711,689

[22] Filed: Jun. 7, 1991

Related U.S. Application Data

[62] Division of Ser. No. 513,654, Apr. 24, 1990, abandoned.

[51] Int. Cl.⁵ ............................................. C08F 2/00
[52] U.S. Cl. ..................................... 526/76; 526/237; 526/290
[58] Field of Search .......................... 526/290, 76, 237

[56] References Cited

U.S. PATENT DOCUMENTS 3,963,653  6/1976  Katayama et al. ................... 260/4
4,933,409  6/1990  Evans et al. ........................ 526/290

FOREIGN PATENT DOCUMENTS 0175593  3/1986  European Pat. Off. .
196844  10/1986  European Pat. Off. .
1363481  5/1964  France .

OTHER PUBLICATIONS

Chemical Abstracts, vol. 86, No. 12; Mar. 21, 1977; Abstract No. 74595V.

Primary Examiner—John C. Bleutge
Assistant Examiner—Mark Sweet
Attorney, Agent, or Firm—Joanne W. Patterson

[57] ABSTRACT

A tackifier resin is prepared by polymerizing a monomer mixture of 10-70% piperylene concentrate and 30-90% of a vinyl aromatic monomer in the presence of a boron trifluoride catalyst and an inert diluent. The resin is water white in color, has a Gardner number of less than one, a softening point of 60° to 120° C. and a polydispersity of 1 to 5. The tackifier is used in formulations based on EVA, block copolymers and polyolefins for hot melt and pressure sensitive adhesive applications.

2 Claims, No Drawings

LIGHT COLORED, AROMATIC-MODIFIED PIPERYLENE RESINS

This application is a division of application Ser. No. 07/513,654, filed Apr. 24, 1990 now abandoned.

BACKGROUND OF THE INVENTION

This invention relates to tackifier resin compositions for use in adhesives and to methods for their preparation. More particularly, this invention relates to light colored tackifier resin compositions prepared from piperylene concentrate and vinyl aromatic monomers and their use in adhesive applications.

Tackifier resins can be used for making thermoplastic adhesives such as hot melts and pressure sensitive adhesives. The adhesives are made of elastomers, block copolymers, ethylene vinyl acetate (EVA), or amorphous polyolefins along with low molecular weight oligomer tackifiers. A common tackifier is made of aliphatic petroleum hydrocarbon feedstocks from ethylene crackers in the oil refinery, using cationic polymerization.

In the industry, $C_5$ resins are commonly made from piperylene concentrates using $AlCl_3$ catalyst at 30°-50° C. These resins have a softening point from 60°-120° C. with a Gardner color from about 4-6. Dark color and poor heat stability of the $C_5$ resins limit applications and there is a need for light color resins. Therefore, the hydrogenated product from aromatic petroleum resin or styrene modified terpene resins are commonly employed for light colored adhesives.

U.S. Pat. No. 4,046,838 discloses a composition of a mixture of (i) an unvulcanized elastomeric block copolymer having the structure A—B—A where A is a nonelastomeric styrene block polymer and B is an elastomeric diene block polymer of 1,3 butadiene and (ii) tackifying resin derived from piperylene. The resin of this patent has Gardner colors greater than 4. U.S. Pat. No. 3,872,064 discloses a hydrocarbon derived resin prepared from the polymerized mixture of a piperylene tackifier in the presence of boron trifluoride ($BF_3$) catalyst. The Gardner color of the resins in this patent is about 4. U.S. Pat. No. 3,853,826 discloses a hydrocarbon derived resin derived from piperylene using a catalyst of boron trifluoride ($BF_3$) together with a boron trifluoride ether complex. This resin has Gardner colors in the range of 2 to 8 and narrow molecular weight distribution. U.S. Pat. Nos. 4,189,547, 4,098,983, and 3,287,332 also disclose hydrocarbon derived resins using a petroleum fraction such as piperylene as a tackifier.

Thermoplastic adhesives can be prepared from elastomers such as block copolymers, oil and tackifiers. These adhesives can be prepared using solvent or by hot melt techniques. Depending on the room temperature tackiness, thermoplastic adhesives can be divided into pressure sensitive adhesives (PSA) and hot melt adhesives. PSA are tacky at room temperature with applications as tape and label adhesives. Hot melt adhesives are not tacky at room temperature and have applications as bookbinding and box closing adhesives.

Hot melt adhesives used for bonding in a particular use or application may be completely unsuitable for other uses or applications. Depending upon the type of construction employed, the adhesive must possess certain physical properties. Perhaps the most stringent properties are those required for adhesives to be used in the bonding of polyethylene films, or the like, to tissue or non-woven substrates in the production of articles, particularly diapers, sanitary napkins and bed pads. Using multi-line construction presents unique problems for the adhesive formulator. The adhesive should possess a high degree of tackiness, since it is applied in the form of very fine parallel longitudinal stripes, thus requiring each line of adhesive to possess exceptionally high bonding properties. The adhesive should also possess sufficient adhesive and cohesive strength to provide high bond strength values when subjected to stress so the contructions cannot be easily separated. As an additional criteria, it is necessary that the adhesive, upon application, not be absorbed throughout the actual disposable construction and that the adhesive bonds not only remain secure but also be flexible even after prolonged periods of storage. In addition to requiring heat and oxidation resistance on aging, they should also possess sufficient bonding range and should be white or clear in color. Recently, hot melt pressure sensitive technology has been developed for non-woven adhesive applications, specifically for diaper adhesives.

U.S. Pat. No. 4,526,577 discloses how to prepare hot melt pressure sensitive adhesives for non-wovens from tackifier resins and block copolymers, specifically multiblock SB and SIS block copolymers. Tackifiers such as $C_5$, styrenated terpenes, cycloaliphatic resins and hydrogenated hydrocarbon resins are employed for hot melt pressure sensitive adhesives. The requirements for the adhesives are stringent in that they should have good adhesion onto polyethylene and non-woven substrates. In addition, hot melt pressure sensitive adhesives are currently being applied by spray techniques at 275°-350° F. requiring good rheological properties at the melt stage.

Prior to the present invention, adhesive compositions using piperylene resins as a tackifier normally had dark color and poor color and viscosity stability upon heat aging. The PSA adhesive compositions also have unbalanced adhesive and cohesive strengths for hot melt applications. Hence, these adhesive compositions had a limited use on a commerical basis.

None of the above mentioned prior art discloses the instant invention.

SUMMARY OF THE INVENTION

The present invention is directed to a tackifier resin composition that is water white in color having a Gardner number of less than one with excellent color stability under heat, a softening point of from about 60° to about 120° C., a weight average molecular weight (Mw) from about 2,000 to about 8,000, a Z average molecular weight (Mz) of from about 3,000 to about 12,000, and a molecular weight distribution (Mw/Mn) of from about 1 to about 5. The composition comprises a polymerized resin prepared from a resin mixture comprising a) 70 to 10% by weight of said resin mixture of piperylene concentrate having a boiling point of from about 30° to about 50° C. produced from cracking of a petroleum oil fraction in a gasoline manufacturing process having a 2-methyl-2 butene content of less than 15% by weight, and a dicyclopentadiene content of less than 5% by weight, and b) 30 to 90% by weight of said resin mixture of a vinyl aromatic monomer.

This invention also comprehends a method for preparing the above mentioned tackifier composition comprising polymerizing at a temperature of −10° to 60° C. a mixture of i) 70 to 10% by weight of piperylene concentrate having a boiling point of 30° to 50° C. produced from the cracking of petroleum oil in a gasoline manufacturing process having a 2-methyl-2-butene content of less than 15% by weight and a dicyclopentadiene content of less than 5%,
ii) 30 to 90% by weight of vinyl aromatic monomer,
iii) 30 to 70% by weight of an inert diluent, and
iv) a sufficient amount of $BF_3$ to catalyze the reaction.

This invention is, also, related to the use of said tackifier resins in adhesive compositions of elastomer block copolymers, amorphous polyolefins, or ethylene-vinyl acetate copolymers.

DETAILED DESCRIPTION OF THE INVENTION

The tackifying resin of this invention has a ring and ball softening point of from about 60° to about 120° C. The resins also have a molecular weight distribution (that is, Mw/Mn) of 1 to 5 with the preferred range being 1.5 to 4.5 and the most preferred range being 2.0 to 4, and a glass transition temperature in the range of −10° to 70° C. with the preferred range being 20° to 60° C. This resin is water white in color with a Gardner number of less than 1 with excellent color stability under heat. These resins exhibit a good solubility in a wide variety of polymeric materials used for adhesives.

In the practice of this invention, the tackifying resin can be used in hot melt adhesive and non-woven adhesive applications. This can be a combination of block copolymers such as styrene-isoprene-styrene (SIS), styrene-butadiene-styrene (SBS), multiblock $(SB)_n$ where n is 100–1,000, or amorphous polyolefins and ethylene-vinyl acetate (EVA), plus tackifier. The tackifier is a modified $C_5$/AMS resin offering excellent tack, high shear strength, water white color (Gardner no. less than 1), a softening point of 60°–120° C., and unique solubility. The new resins are excellent tackifiers in stereon 840A as well as in SBS (Kraton 1102) and SIS (Kraton 1107) systems since they exhibit good compatibility with the butadiene and isoprene domains of the block copolymers. The tackifier is suitable for disposable applications in SBS, $(SB)_n$, and SIS systems and for pressure sensitive adhesive tapes. In addition, they can be used in hot melt EVA systems with a vinyl acetate content of 20–40% because the tackifiers offer light color, heat stability and an excellent balance in cohesive and adhesive strengths making them suitable for hot melt packaging type adhesives.

Various aliphatic and aromatic hydrocarbon diluents can be used to prepare the tackifying resin of this invention. Representative examples of such aromatic hydrocarbons are toluene and benzene; and representative examples of aliphatic hydrocarbons are pentane, hexane, heptane and octane. A particularly suitable hydrocarbon solvent is a mixture containing from about 10 to about 90 parts of toluene and correspondingly from about 90 to 10 parts of hexane.

The feed material used to produce the tackifier resin of the present invention is a hydrocarbon feed material having five carbons. The preferred hydrocarbon feed material is a piperylene concentrate which is a mixture of an organic fraction produced from the cracking of petroleum oil in a gasoline manufacturing process. The primary constituents of this feed stream are the two isomers of piperylene (cis and trans); in addition to the piperylene, $C_5$ monomers are present such as methylbutenes and pentenes (both linear and cyclic). This feed should have less than 15% of 2-methyl-2-butene. The remainder of the resin feed is composed of heavier and lighter reactives and unreactives such as dicyclopentadiene (less than 5%), cyclopentene, isoprene, and pentanes. The most preferred piperylene concentrate is a commercial concentrate such as piperylene concentrate which is a mixed monomer stream of 55 weight percent pentadienes-1,3-(total cis and trans isomers), 10 weight percent of 2-methyl-butene, 14 weight percent of cyclopentene, 4 weight percent of pentene-2 (total cis and trans isomers), 10 weight percent alkanes (total pentane, cyclopentane, and neohexane), and 7 weight percent of aliphatic olefins and diolefins. This commercial piperylene concentrate has the properties required for the instant invention.

The piperylene concentrate should be about 70 to about 10 percent by weight of the reaction mixture.

Any of the vinyl aromatic monomers may be used to synthesis the tackifying resin of this invention. However, the vinyl aromatic monomers preferably will be styrene, alpha-methylstyrene (AMS), para-methylstyrene (PMS), vinyl-toluene, and t-butylstyrene. The most preferred is AMS. The feed stream for preparing the tackifier resin should have from about 30 to 90% by weight, and preferably 30–70%, of the vinyl aromatic component.

Boron trifluoride gas or the complexes of boron trifluoride with, for example, water, alcohols, ethers, phenols, and the like can be used for the polymerization catalyst for this invention. Complexes of inorganic acids with $BF_3$, such as phosphoric acid/$BF_3$, can also be used.

The polymerization temperature for preparing the tackifier resin of this invention is from about −10° to 60° C., preferably 0° to 10° C. The molecular weight of the tackifier resin and its solubility a polymeric material changes depending upon the polymerization temperature. In general, when the polymerization temperature of the resin is increased, the resin's molecular weight is decreased and its solubility favors polar polymers.

In the practice of this invention, adhesive compositions can be prepared by mixing the tackifying resin with an elastomeric block copolymer (such as styrene-butadiene-styrene (SBS) or styrene-isoprene-styrene (SIS) terpolymers) and oil using volatile organic hydrocarbon solvents or by melt mixing at 300°–350° F. The adhesive mixture of the tackifying resin, elastomeric block copolymer, and oil can be used for bonding substrate surfaces by applying the adhesive by hot melt or spraying equipment.

EXAMPLES

All percentages and/or parts are based on weight measurements unless otherwise noted.

The following tests were performed on the resin prepared in the Examples set forth infra:

STATIC TIME TO FAILURE BOND TEST

This testing method was described in U.S. Pat. No. 4,526,577. Adhesive (held at 325° F.) was applied to a series of polyethylene surfaces ½ inch in width and 1½ inches long and hand compressed onto similar size sheets of Kraft paper. The bonds were hung vertically with 50 gram weights and maintained at 105° F. The time to failure was noted.

This test is an indication of the heat resistance of the adhesive under temperature conditions approximating those encountered during use (wear) of the disposable construction. Long failure times are desirable indicating strong bonds which are particularly essential in certain areas of the disposable constructions which are subjected to greater stress during use.

GARDNER COLOR

Two procedures were used for determining the molten Gardner color of tested samples. The Molten Gardner Color of unaged samples was determined as follows: (1) 20 gram samples were weighed into a 30 ml glass beaker. The beaker was covered with aluminum foil and heated in a 120° C. oven until the sample in the beaker becomes molten (about 5 to 15 minutes). The molten sample is then poured into a Gardner viscosity tube; and the tube is placed into a Gardner Color Comparator for determining the color. The color that closely matches the ones on the Comparator is read off the scale on the Comparator. (2) The Molten Gardner Color of aged at 177° C. samples was determined as follows: The procedure is the same as described in (1) above except that the sample is not covered with aluminum foil when it is placed in the oven.

DICHROMATE COLOR

This is a method for determining the color of water white resins, specifically those resins having Gardner colors less than one. A 25% solution of the sample in toluene is compared spectrophotometrically with potassium dichromate color standards. The method uses a UV-visible spectrophotometer. The absorbance is measured at the maximum absorption peak of $K_2Cr_2O_7$ at 349.5 nm using 1.0 cm cells.

The resin samples are dissolved in reagent grade toluene and the absorption read at 349.5 nm. The equivalent $K_2Cr_2O_7$ value is in parts per million (ppm) and is read from a calibration plot. It has been estimated that a Gardner color of 1 is approximately equivalent to a reading of 50 ppm of $K_2Cr_2O_7$ using this method.

DEFINITION OF TERMS USED IN THE EXAMPLES

Solvents

A—HiSol-10, a commercial aromatic solvent marketed by Ashland Chemical Co. Major components are the various ethyltoluenes and other substituted toluenes.

B—dried xylene

C—dried recycled toluene of fractionated primarily aromatic solvent, obtained by taking the middle distillation cut from a polymerization of $C_5$ hydrocarbons in a toluene diluent.

D—dried recycled hydrogenation solvent is an aliphatic/cycloaliphatic solvent recycled from a hydrogenation process of hydrocarbon resins.

"OMSCP" means odorless mineral spirits cloud point which is determined by the following procedure: A 10 weight percent resin is mixed in a test tube with odorless mineral spirits. The test tube is then heated until a clear solution is formed.

The solution is cooled until turbidity is obtained. The onset of initial turbidity is recorded as the initial cloud point. Cooling of the test tube is continued until visibility is totally obstructed. The final cloud point is recorded at the point of no visibility.

"MMAP" means mixed methylcyclohexane aniline cloud point which is determined using a modified ASTM D 611 procedure. Methylcyclohexane is substituted for the heptane used in the ASTM D 611 test procedure. The procedure uses resin/aniline/methylcyclohexane in a ratio of 1/2/1 (weight/volume/volume) and the cloud point is determined by cooling a previously heated, clear blend of the three components until complete turbidity just occurs.

"R & B Soft. Pt." means the Ring and Ball Softening Point according to ASTM E28-67

"Mw" means weight average molecular weight.

"Mn" means number average molecular weight.

"Mz" means the higher moment of the higher molecular weight distribution based on the mathematical definition:

$$\frac{\Sigma n_i m_i^3}{\Sigma n_i m_i^2}$$

where $n_i$ is the number of molecules of molecular weight $M_i$. All molecular weights were measured by Size Exclusion Chromatography.

"Pd" means polydispersity of molecular weight of resin defined as Mw/Mn.

EXAMPLES 1-19

The reagents, Lyondell piperylene concentrate (LPC), alpha-methylstyrene (AMS), and a solvent such as HiSol-10, were passed through a chromatography column (2 cm × 50 cm) filled with activated alumina, at a rate of 10 to 20 ml per minute to remove dissolved and/or entrained moisture.

The amounts of reagents as shown in Table I, infra, were then weighed out and placed into a one liter round bottom reaction flask equipped with a mechanical Teflon stirrer, a gas feed tube, a nitrogen gas inlet tube, and a thermometer. Table I, infra, sets forth the percentages of the ingredients in the reaction mass, conditions, and results; for the sake of demonstrating the procedure, the amounts of the ingredients for Example 1 were 300 grams of HiSol-10, 180 grams of LPC, and 120 grams of AMS. A nitrogen gas line was connected to the flask and nitrogen was bubbled through the reactants in the flask at a very slow rate while the flask was being cooled to the reaction temperature of 0° C. by using an external cooling bath of isopropanol and dry ice. $BF_3$ gas was then passed through the gas feed tube line into the flask below the liquid level at approximately 0.079 grams per minute while stirring the reactants in the flask. The $BF_3$ was fed stepwise into the flask in discrete amounts of from 0.1 gram per minute to 0.4 gram per minute until a strong exotherm was observed which was kept under control by the external cooling bath.

Once the reaction was completed, the reaction mixture was then neutralized with lime, ammonium hydroxide, or soda ash. The neutralized organic reaction mixture was separated from the neutralization products; and the organic phase was vacuum or steam distilled to remove the solvent and low molecular weight oils. The resin was analyzed and the results are set forth in TABLE I below. The new $C_5$ resin also had a light initial color (Gardner no. less that −1) and excellent color and viscosity stability upon heat aging compared to similar commercial resins as shown in Table II. Specifically, the $C_5$ resin prepared from $BF_3$ catalyst has much better color stability than the similar resin prepared with $AlCl_3$ catalyst.

TABLE I

| Example No. | Solvent | Wt % LPC | Wt % AMS | Reaction Temp °C. | OMSCP (init.) °C. | OMSCP (full) °C. | MMAP °C. | R & B Soft pt. °C. | % yield | Molecular Weights | | | | Gardner Color |
|---|---|---|---|---|---|---|---|---|---|---|---|---|---|---|
| | | | | | | | | | | Mw | Mn | Mz | Pd | |
| 1 | A | 60 | 40 | 10° | 30 | 23 | 48 | 74 | 80.1 | 2753 | 806 | 7426 | 3.41 | <G-1 |
| 2 | A | 20 | 80 | 10° | >180 | 157 | 11 | 120 | 86.8 | 2816 | 811 | 7249 | 3.47 | <G-1 |
| 3*** | A | 60 | 40 | 25° | −10 | −36 | 43 | 64 | 77.6 | 1798 | 697 | 4862 | 2.58 | — |
| 4*** | B | 60 | 40 | 25° | −23 | −27 | 43 | 71 | 74.4 | 2018 | 961 | 4677 | 2.10 | — |
| 5*** | C | 60 | 40 | 25° | −23 | −26 | 42 | 69 | 73.9 | 1930 | 829 | 5140 | 2.33 | — |
| 6 | D | 60 | 40 | 25° | 9 | −2 | 42 | 72 | 66.8 | 2110 | 820 | 6776 | 2.57 | <G-1 |
| 7 | A | 60 | 40 | 0° | 105 | 94 | 49 | 83 | 73.1 | 3931 | 900 | 12048 | 4.37 | <G-1 |
| 8 | A | 60 | 40 | 50° | −25 | −50 | 27 | 54 | 62.3 | 875 | 621 | 1473 | 1.41 | <G-1 |
| 9 | C | 55 | 45 | 5 | 48 | 39 | 49 | 90 | — | 2785 | 752 | 8061 | 3.70 | <G-1 |
| 10 | A | 40 | 60 | 25 | 37 | 31 | 23.5 | 90 | 80 | 1729 | 735 | 4272 | 2.35 | <G-1 |
| 11 | A | 58 | 42 | 10 | 70 | 62 | 44 | 77.5 | 77 | 2964 | 791 | 9074 | 3.75 | <G-1 |
| 12 | A | 57 | 43 | 5 | 70 | 61 | 47 | 83 | 79 | 3202 | 927 | 8729 | 3.45 | <G-1 |
| 13 | A | 50 | 50 | 5 | 90 | 83 | 41 | 95 | 81 | 3210 | 954 | 8514 | 3.36 | <G-1 |
| 14 | A | 40* | 50* | 10 | 74 | 66 | 37 | 87 | 79 | 1805 | 659 | 5567 | 2.74 | <G-1 |
| 15 | A | 60 | 40 Styrene | 10° | −27 | −70 | 31 | 48 | 75.4 | 1421 | 687 | 3427 | 2.07 | <G-1 |
| 16 | A | 60 | 20 AMS/ 20 p-methyl-styrene | 10° | −20 | −32 | 50 | 71 | 80.3 | 2883 | 967 | 7313 | 2.98 | — |
| 17 | A | 10 | 90 | 10° | >180 | 166 | 9 | 119 | 86.1 | 2376 | 609 | 6832 | 3.88 | <G-1 |
| 18** | A | 60 | 40 | 10° | 25 | 12 | 45 | 72 | 80 | 2420 | 906 | 6309 | 2.67 | — |
| 19 | A | 60 | 40 | 10° | 48 | 38 | 48 | 78 | 79.2 | 3093 | 958 | 8432 | 3.23 | <G-1 |
| Comp-1 | A | 100 | 0 | 10° | −68 | <−70 | 82.5 | — | 58.7 | 1226 | 564 | 3397 | 2.17 | — |
| Comp-2 | A | 100 | 0 | −30° | −72 | <−72 | 90 | 26 | 62.3 | 2186 | 848 | 6467 | 2.58 | — |

***Although the Gardner Color was not measured for these samples, the samples were water white in color based on a visual inspection.
*Resin also contained 10% by weight of isobutylene
**Monomers were not dried.

TABLE II

RESIN AGING COLOR STABILITY*

| Resin | Initial | 8 hours | 24 hours | 48 hours |
|---|---|---|---|---|
| C5/AMS (example 9) | <−1 | 2 | +6 | 12 |
| RES-D 2083** | 3 | 7 | 11 | 13 |
| Piccotac HM 2162*** | 4 | 6 | 12 | 16 |
| ECR 149B**** | −1 | 6 | 12 | 16 |

*Aged at 177° C. in air convected oven
**RES-D 2083 is a styrenated terpene resin from Hercules Incorporated.
***Piccotac HM 2162 is a styrenic modified C5 resin using AlCl3 catalyst.
****ECR 149B is a partially hydrogenated C9 resin from Exxon Corporation.

EXAMPLE 20

A mixture of 60% of LPC and 40% of AMS were semi-continuously polymerized at 25° C. in recycled toluene using BF3 catalyst.

Following the procedure for drying the reagents as outlined in Example no. 1, sufficient material was dried to make up a 1000 to 2000 gram preblend of the indicated ratios at 50 percent monomer by weight. Approximately 100 grams of recycled toluene were charged into a 500 ml bottom drain round bottom flask equipped with a thermometer well, teflon stirrer with bearing, cold finger condenser, and a feed funnel. BF3 was fed into the flask at a rate of 0.021 grams per minute until an exotherm occurred; the exotherm was controlled by use of an external cooling bath. Sufficient BF3 was fed into the flask until an excess was observed coming out of the cold finger condenser (this was facilitated by a nitrogen purge on the addition funnel). Once this excess was observed, 200 grams of preblend were continuously fed into the flask over a 30 minute period while BF3 gas was being added to the reaction vessel. After the addition of all of the preblend, the reaction temperature was maintained for a period of 30 minutes while stirring. 200 grams of the reacted solution were drained from the flask and was neutralized by the addition of about 50 grams of lime. The addition funnel was filled with 200 grams of the same feedblend and the procedure was repeated for four or more 200 gram quantities. Each time the polymerization was reinitiated by the addition of new feed blend, a residual amount of the previous polymerization reaction product was left in the bottom of the reaction flask (100 grams).

The properties of the resins produced continued to change until the fourth or fifth 200 gram quantities. The resin produced after the 4th reactor volume was essentially identical to resin produced in the 4th reactor volume. The properties of the resins produced from this reaction are listed in Table III.

TABLE III

| | Experiment | | | |
|---|---|---|---|---|
| | 1 | 2 | 3 | 4 |
| R & B Soft. Pt. (°C.) | 70 | 68 | 68 | 68 |
| MMAP (°C.) | 43.5 | 42.0 | 42.0 | 42.0 |
| OMSCP (initial/full) °C. | −8/<−70 | −5/<−70 | −30/<−70 | −30/<−70 |
| % Yield | 79.2 | 80.7 | 78.4 | 77.7 |
| Dichromate Color (ppm) | 21.5 | 21.0 | 26.5 | 26.5 |
| Mw (UV) | 1913 | 1750 | 1723 | 1673 |
| Mn (UV) | 709 | 757 | 778 | 756 |
| Mz (UV) | 5158 | 4397 | 4182 | 3913 |
| Pd (UV) | 2.70 | 2.31 | 2.21 | 2.21 |

EXAMPLE 21

A mixture of 40% of LPC and 60% of AMS were continuously polymerized at 10° C. in recycled toluene using BF3 catalyst.

Two 500 ml reaction flasks equipped with overflows were connected in series. The reaction flasks were equipped with teflon stirrers with bearings, thermometers, BF3 feed tube on the reactor, monomer feed (below liquid level) on the reactor, and nitrogen sparge.

A metering pump was used to pump a preblend of 600 grams of recycled toluene, 560 grams of LPC, and 840 grams of AMS that had been dried through activated alumina as described in Example no. 1. First, approximately 100 grams of this preblend were added to the reactor. Then, the monomer was polymerized by the addition of $BF_3$ at the rate of 0.021 gram per minute while stirring and maintaining the reaction temperature through the use of an external cooling bath. Once the initial reaction was completed, the feed of the preblend and $BF_3$ was begun again to be fed into the reactor continuously. The preblend was fed into the reactor at a rate of 10 to 12 ml per minute using the metering pump. Once the first reactor in the series was full, it overflowed by gravity into the second reactor where reaction was continued as this second reactor filled. The effluent from the second overflow flask was collected into a beaker and neutralized with either $NH_4OH$ or lime. The physical properties of the resins produced reached steady state after 3 to 4 reactor volumes.

The physical properties of the resins produced are tabulated in Table IV, infra.

TABLE IV

| | Reactor Volume No. | | | | |
|---|---|---|---|---|---|
| | 1 | 2 | 3 | 4 | 5 |
| R & B Soft Pt. (°C.) | 90.0 | 88.0 | 86.0 | 86.0 | 83.0 |
| MMAP (°C.) | 25.0 | 26.0 | 25.0 | 25.0 | 24.0 |
| OMSCP (initial/full °C.) | >180 | >180/145 | 160/100 | 155/37 | 90/10 |
| % Yield | 75.8 | 70.9 | 67.7 | 77.4 | |
| Mw (UV) | 2102 | 1962 | 1693 | 1730 | 1634 |
| Mn (UV) | 471 | 690 | 696 | 687 | 696 |
| Mz (UV) | 13198 | 6761 | 4434 | 4399 | 4058 |
| Pd (UV) | 4.46 | 2.84 | 2.43 | 2.52 | 2.35 |

A resin of 60% of LPC and 40% of AMS was partially fractionated using odorless mineral spirits (a $C_7$ and higher aliphatic diluent) as the fractionating medium. About 2 grams of the resin were dissolved in the odorless mineral spirits in a test tube by heating with a bunsen burner. After the resin was dissolved, the test tube was let stand and cooled at room temperature for a period of time. A precipitate formed at the bottom of the test tube. Gel-permeation chromatography and infrared spectroscopy analyses were run on the initial resin and this precipitate to determine the molecular weight and composition. The results are reported in Table V, below.

TABLE V

| | Base Resin | Fractionated |
|---|---|---|
| Dichromate Color (ppm) | 16 | |
| Specific Gravity (g/cc) | 0.983 | |
| Glass Temperature (°C.) | 24.5 | |
| Bromine No. (mg/g) | 2.5 | |
| Acid No. | 0.30 | |

TABLE V-continued

| | Base Resin | Fractionated |
|---|---|---|
| UV alpha (l/gm) | 1.395 | |
| Saponification No. | 0.60 | |
| Flash Point (°F.) | 505 | |
| Fire Point (°F.) | 565 | |
| Solut. Visc 70% in Tol. | 8.3 | |
| Ring & Ball Soft. Pt. (°C.) | 79.0 | |
| MMAP (°C.) | 49.0 | |
| OMSCP (initial/full °C.) | 70/60 | |
| Mw (UV) | 3197 | 11131 |
| Mn (UV) | 881 | 2783 |
| Mz (UV) | 9197 | 17989 |
| Pd (UV) | 3.63 | 4.00 |
| % AMS (Infrared Analysis) | 38 | 89 |

These data indicate that the $C_5$/AMS that was prepared in this Example has a high molecular weight tail with more aromatic solubility. This high molecular weight aromatic soluble resin will improve the shear properties of the adhesives based on styrenic block copolymer as shown in Tables VI and VII.

EXAMPLE 23

The experimental 55% $C_5$/45% AMS resin made as per Example 9 was formulated with SIS block copolymer marketed under the name (Kraton 1107 by Shell Co.) to evaluate its performance in hot melt pressure sensitive adhesives (see Tables VI). The control samples are ECR-149B (from Exxon) and RES D-2083 (styrenated limonene resin marketed by Hercules Incorporated). This $C_5$/AMS resin has excellent pressure sensitive properties to polyethylene and steel substrates similar to the control samples.

TABLE VI

| Adhesive Resin Composition | 1 (parts) | 2 (parts) | 3 (parts) | 4 (parts) |
|---|---|---|---|---|
| $C_5$/AMS (Example 9) | 50 | — | — | 50 |
| ECR-149B | — | 50 | — | — |
| RES D-2083 | — | — | 50 | — |
| Kristalex 5140 | — | — | — | 10 |
| Kraton 1107 | 50 | 50 | 50 | 50 |
| Mineral Oil | 10 | 10 | 10 | 10 |
| PSA Properties* | | | | |
| 180° C. Peel (oz/in) | 79 ± 3 | 99 ± 11 | 78 ± 2 | 78 ± 16 |
| Quick Stick (oz/in) | 60 ± 1 | 52 ± 2 | 52 ± 2 | 47 ± 18 |
| Loop Tack to SS (oz/in) | 94 ± 9 | 101 ± 4 | 94 ± 3 | 30 ± 2 |
| Loop Tack to PE (oz/in) | 38 ± 4 | 36 ± 7 | 28 ± 10 | 6 ± 3 |
| SAFT (°C.) | 72 ± 2 | 69 ± 2 | 72 ± 1 | 76 ± 1 |
| Melt Viscosity @ 350° F. (cp) | 40,700 | 38,500 | 43,700 | 38,400 |

*Pressure Sensitive Tape Council (PSTC) Method

The $C_5$/AMS resin in the example, also, can be compounded with Kraton 1112 with low melt viscosity for sprayable hot melt applications in the non-woven applications industry.

TABLE VII

| | FORMULATION 1 | FORMULATION 2 | FORMULATION 3 | FORMULATION 4 | FORMULATION 5 | FORMULATION 6 | FORMULATION 7 |
|---|---|---|---|---|---|---|---|
| Resin Example 10 | 63 | — | — | — | — | — | — |
| Resin Example 11 | — | — | 63 | — | — | — | — |
| Resin Example 12 | — | 63 | — | — | — | — | — |
| RES D-2083 | — | — | — | 63 | — | — | — |
| RES D-2137$^a$ | — | — | — | — | 63 | — | — |
| Arkon M-90 | — | — | — | — | — | 60 | — |
| ECR-149B | — | — | — | — | — | — | 63 |
| Stereon 840A | 20 | 20 | 20 | 20 | 20 | 20 | 20 |
| Mineral Oil | 17 | 17 | 17 | 17 | 17 | 20 | 17 |
| Tg (°C.)* | 30° C. | 25° C. | 23° C. | 20° C. | 18° C. | 13° C. | 26° C. |

TABLE VII-continued

|  | FORMU-LATION 1 | FORMU-LATION 2 | FORMU-LATION 3 | FORMU-LATION 4 | FORMU-LATION 5 | FORMU-LATION 6 | FORMU-LATION 7 |
|---|---|---|---|---|---|---|---|
| G' at 25° C.* (dyne/cm²) | $4.5 \times 10^6$ | $1.5 \times 10^6$ | $7.0 \times 10^5$ | $5.4 \times 10^5$ | $4.3 \times 10^5$ | $2.8 \times 10^5$ | $1.9 \times 10^6$ |
| G' at 37° C. (dyne/cm²) | $5.2 \times 10^5$ | $3.5 \times 10^5$ | $1.9 \times 10^5$ | $2.1 \times 10^5$ | $1.8 \times 10^5$ | $1.6 \times 10^5$ | $3.1 \times 10^5$ |
| Static Peel | 0.2 hr | 19.4 hrs | 16 hrs | 11.6 hrs | 4.4 hrs | 2.9 hrs | 5.9 hrs |
| Failure Mode | Cohesive | Cohesive | Cohesive | Cohesive | Cohesive | Adhesive | Adhesive |
| Tack (to PE) | Poor tack | Excellent | Excellent | Excellent | Excellent | Excellent | Excellent |

*Dynamic mechanical properties measured by RMS
<sup>a</sup>RES D 2137 is a C₅ resin polymerized with AlCl₃ of Hercules Incorporated.

EXAMPLE 24

The experimental C₅/AMS resins (Examples 12, 11, and 10) were formulated with Stereon 840A (SB) from Firestone, Inc. to prepare pressure sensitive adhesives for nonwoven applications. The formulations are shown in Table VII. This table also includes styrenated terpene resin (RES D-2083 from Hercules), styrene modified C₅ resin (RES D-2137 from Hercules), and hydrogenated C₉ resin Arkon M-90 from Arakawa, Japan). The adhesives using C₅/AMS resins have higher shear strength (static peel) than the control samples because the C₅/AMS resins contain higher molecular weight aromatic fractions as shown in Table V. The adhesives, also, can be easily sprayable using the Nordson's hot melt equipment.

EXAMPLE 25

The experimental C₅/AMS resin (Example 9) was formulated with SBS block copolymer (Kraton 1102 from Shell Co.) to evaluate its PSA property for nonwoven, label, and tape applications. The resins' performance were compared with the PSA property of the resin containing styrene modified terpene (Res-D 2083) in Table VIII.

EXAMPLE 26

The experimental resins (Examples 14 and 10) and styrene modified terpene resin (RES D-2083) were compounded with EVA (28% VA Elvax 240 from Du Pont) and wax (Chevron 159) at 160° C. using melt processing; and the hot melt adhesive performance data of the resins are set forth in Table IX. The EVA hot melts containing C₅/AMS resins have performed similarly in compatibility and mechanical properties to the hot melt with styrenated terpene resin. Consequently, the hot melt adhesive made with the C₅/AMS resin of this invention can be used for various applications such as in base cup, bookbinding, box closing, and carton sealing.

TABLE VIII

| Adhesive resin Composition | 1 | 2 | 3 | 4 | 5 | 6 |
|---|---|---|---|---|---|---|
| C₅/AMS (Example 9) | 44 | — | 46 | — | 48 | — |
| RES-D 2083 | — | 44 | — | 46 | — | 48 |
| Kraton 1102 | 32 | 32 | 31 | 31 | 30 | 30 |
| Oil (Kaydol) | 24 | 24 | 23 | 23 | 22 | 22 |
| Quick Stick | 24 | 15 | 27 | 15 | 27 | 22 |
| (oz/in), SS | | | | | | |
| Quick Stick (oz/in), PE | — | — | 12 | 6 | — | — |
| 180° peel (oz/in), SS | 43 | 23 | 54 | 27 | 54 | 35 |
| 180° peel (oz/in), PE | — | — | 16 | 13 | — | — |

TABLE IX

|  | 1 | 2 | 3 |
|---|---|---|---|
| Example 14 | — | 33.3 | — |
| Example 10 | 33.3 | — | — |
| RES D-2083 | — | — | 33.3 |
| EVA 240* | 33.3 | 33.3 | 33.3 |
| Chevron Wax | 33.3 | 33.3 | 33.3 |
| Cloud Point (°C.) | 113 | 84 | 75 |
| Tensile (psi) | 441 | 462 | 365 |
| Elongation (%) | 76 | 87 | 77 |
| Modulus (psi) | 10,100 | 9,510 | 8,400 |
| Viscosity (200° F.) | 16,250 cps | 26,000 cps | 20,650 cps |
| Gardner Color |  |  |  |
| Initial | −1 | −1 | +2 |
| 24 hrs aging at 177° C. | 2 | −3 | −6 |

*This is marketed under the mark EVAX 240 by DuPont Company.

What is claimed is:

1. A method of preparing a composition that is water white in color, has a Gardner number of less than one with excellent color stability under heat, a softening point of from about 60° to about 120° C., a weight average molecular weight ($M_w$) of from about 2,000 to about 8,000, a Z average molecular weight ($M_z$) of from about 5,000 to about 12,000, and a molecular weight distribution ($M_w/M_n$) of about 1 to about 5, comprising
    (1) polymerizing at a temperature of −10° to 60° C. a mixture consisting essentially of
        i) 10 to 60% by weight of a piperylene concentrate having a boiling point of 30° to 50° C. produced from the cracking of petroleum oil in a gasoline manufacturing process and having a 2-methyl-2-butene content of less than 5%, and
        ii) 40 to 90% by weight of a vinyl aromatic monomer,
    in the presence of 30 to 70% by weight of an inert diluent and a sufficient amount of BF₃ to catalyze the reaction, and
    (2) removing the diluent and catalyst from the reaction mass to produce a final product in a yield of at least 55%.

2. The method of claim 1 wherein the vinyl aromatic monomer is alpha-methylstyrene.

* * * * *

UNITED STATES PATENT AND TRADEMARK OFFICE
CERTIFICATE OF CORRECTION

PATENT NO. : 5,177,163
DATED : January 5, 1993
INVENTOR(S) : Norman E. Daughenbaugh, Jr., et al It is certified that error appears in the above-indentified patent and that said Letters Patent is hereby corrected as shown below:

On the title page item [75] should read --Norman E. Daughenbaugh, Jr., Turtle Creek; Mark J. Rosner, Jeannette, both of Pa.--

Signed and Sealed this

Second Day of November, 199:

Attest:

BRUCE LEHMAN

Attesting Officer          Commissioner of Patents and Trademarks